(12) United States Patent
Tsai et al.

(10) Patent No.: US 8,636,370 B2
(45) Date of Patent: Jan. 28, 2014

(54) ENGAGEMENT ASSEMBLY FOR CONNECTING REFLECTOR AND CONNECTING ROD

(75) Inventors: Cheng-kang Tsai, Tainan (TW); Jin-hua Wu, Tainan (TW); Fu-chi Shieh, Tainan (TW)

(73) Assignee: T.Y.C. Brother Industries Co., Ltd., Tainan (TW)

( * ) Notice: Subject to any disclaimer, the term of this patent is extended or adjusted under 35 U.S.C. 154(b) by 107 days.

(21) Appl. No.: 13/218,449

(22) Filed: Aug. 26, 2011

(65) Prior Publication Data
US 2013/0050861 A1    Feb. 28, 2013

(51) Int. Cl.
*G02B 7/182*    (2006.01)
*B60R 1/02*    (2006.01)

(52) U.S. Cl.
USPC .......................................... 359/871; 248/481

(58) Field of Classification Search
USPC .......... 359/871, 879, 267; 248/474, 476, 549, 248/480–482; 403/374.2, 374.3, 345
See application file for complete search history.

(56) References Cited

U.S. PATENT DOCUMENTS

| 5,793,543 A * | 8/1998 | Kimura et al. ................. 359/875 |
| 2004/0125476 A1 * | 7/2004 | Boddy et al. ................... 359/879 |

* cited by examiner

*Primary Examiner* — Alessandro Amari
*Assistant Examiner* — Jie Lei
(74) *Attorney, Agent, or Firm* — Cheng-Ju Chiang

(57) ABSTRACT

The present invention provides an engagement assembly for connecting a reflector and a connecting rod. The engagement assembly has a fixing base and a fixing plate. The fixing base has a head accommodating room for holding a head portion of the connecting rod and a plate retaining space formed between two protrusion rings. The fixing plate is mounted in the plate retaining space and has a position-limiting portion and two fixing portions. The position-limiting portion has a through hole for inserting the head portion and at least two tongues. The tongues are mounted on an inner edge of the through hole for clamping the head portion of the connecting rod that has entered the head accommodating room. The engagement assembly provides a strong linking structure for the reflector and the connecting rod.

15 Claims, 7 Drawing Sheets

ENGAGEMENT ASSEMBLY FOR CONNECTING REFLECTOR AND CONNECTING ROD

FIELD OF THE INVENTION

The present invention relates to an engagement assembly, and more particularly to an engagement assembly for connecting a reflector and a connecting rod.

BACKGROUND OF THE INVENTION

With reference to FIGS. 7 and 8, a conventional engagement device, FIGS. 7 and 8 are a side-view and an operation view of a conventional engagement device for connecting a reflector and a connecting rod. An engagement device 9 is a plastic injected molded device that is used to be mounted on a back of a vehicle reflector 8 and has a first connecting portion 90 and a second connecting portion 91. The first connecting portion 90 is used to be fixed on a connecting post 80 on the back of the reflector 8. The second connecting portion 91 is extended from an end of the first connecting portion 90 and has an opening 911 and an accommodating space 912 communicated with the opening 911. The opening 911 has at least one tongue 910 obliquely formed on a periphery thereof.

The opening 911 of the second connecting portion 91 offers a head portion of a connecting rod 7 to be correspondingly inserted therethrough. The connecting rod 7 is fixed on a vehicle body. When mounting the reflector 8 on the vehicle body, the opening 911 of the second connecting portion 91 is correspondingly engaged with the head portion of the connecting rod 7, and the tongue 910 of the second connecting portion 91 will be pushed by the head portion and bend so that the head portion is able to be inserted into the accommodating space 912 of the second connecting portion 91. When the tongue 910 returns to a former state, the head portion then is restricted inside the accommodating space 912 and unable to be pulled out. Therefore, the reflector 8 is able to be mounted on the vehicle body through the attachment of the engagement device 9 to the connecting rod 7. In the meantime, the head portion of the connecting rod 7 can appropriately move in the accommodating space 912, hence the angle of the reflector 8 can be adjusted as desired.

However, since the engagement device 9 is a plastic injected molded device and lacks tolerance of impact, it may be easily damaged during being attached to the connecting rod 7.

Hence, it is necessary to provide an engagement assembly for connecting a reflector and a connecting rod to overcome the problems existing in the conventional technology.

SUMMARY OF THE INVENTION

A primary object of the invention is to provide an engagement assembly for connecting a reflector and a connecting rod that has a combination structure of a fixing plate and a fixing base so as to provide a stronger linking structure between the reflector and the connecting rod.

To achieve the above object, the present invention provides an engagement assembly for connecting a reflector and a connecting rod, and the engagement assembly is used to be mounted between a linking post of a reflector and a connecting rod and comprises:

a fixing base having a head accommodating room, a first protrusion ring, second protrusion ring, a plate retaining space and two slits, wherein the head accommodating room is for inserting a head portion of the connecting rod; the first protrusion ring has two side pillars formed on a bottom thereof; the second protrusion ring is connected to the side pillars; the plate retaining space is formed between the first and the second protrusion rings; the slits are formed on junctions of the side pillars and the first protrusion ring, respectively; and a fixing plate mounted in the plate retaining space and having a position-limiting portion and two fixing portions, wherein the position-limiting portion has a through hole and at least two tongues, wherein the through hole corresponds to the head accommodating room and is used for the head portion of the connecting rod to pass through, and the tongues are formed on an inner edge of the through hole for clamping the head portion; the fixing portions are connected to the position-limiting portion and pass through the slits of the fixing base, respectively, and each fixing portion has a buckle portion formed on an inner edge thereof.

In one embodiment of the present invention, the fixing base further has a connecting portion, and the connecting portion is integrally connected to the second protrusion ring for being attached to the linking post of the reflector.

In one embodiment of the present invention, the plate retaining space of the fixing base communicates with the head accommodating room.

In one embodiment of the present invention, the tongues and the buckle portions are elastic structures.

In one embodiment of the present invention, a distance between inner edges of the tongues of the fixing plate is shorter than an external diameter of the head portion of the connecting rod.

In one embodiment of the present invention, each of the tongues has a strengthening portion formed at a junction between the tongue and the inner edge of the through hole.

In one embodiment of the present invention, each of the tongues of the fixing plate obliquely extends from the inner edge of the through hole.

In one embodiment of the present invention, the buckle portion of each of the fixing portion obliquely protrudes from a surface of the corresponding fixing portion.

In one embodiment of the present invention, the fixing plate is a steel plate.

The present invention helps connect the reflector and the connecting rod fixed on the vehicle and is able to effectively enhance the strength of attachment while maintaining the flexibility of adjusting the angle of the reflector.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 6:
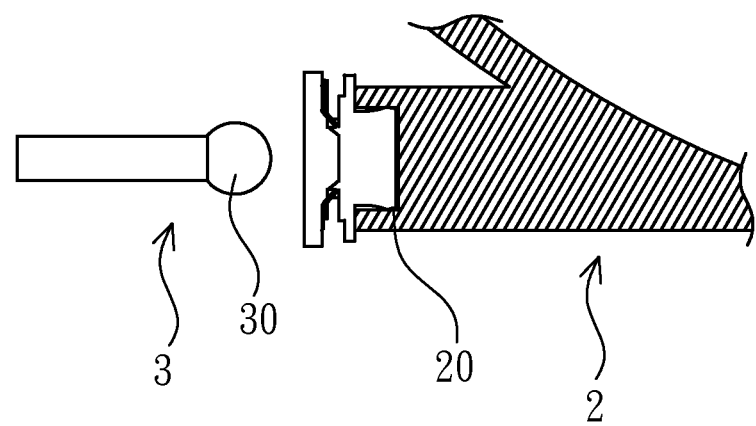
FIG. 6 is an operational view of a preferred embodiment of the engagement assembly for connecting a reflector and a connecting rod according to a preferred embodiment of the present invention.
Figure 7:
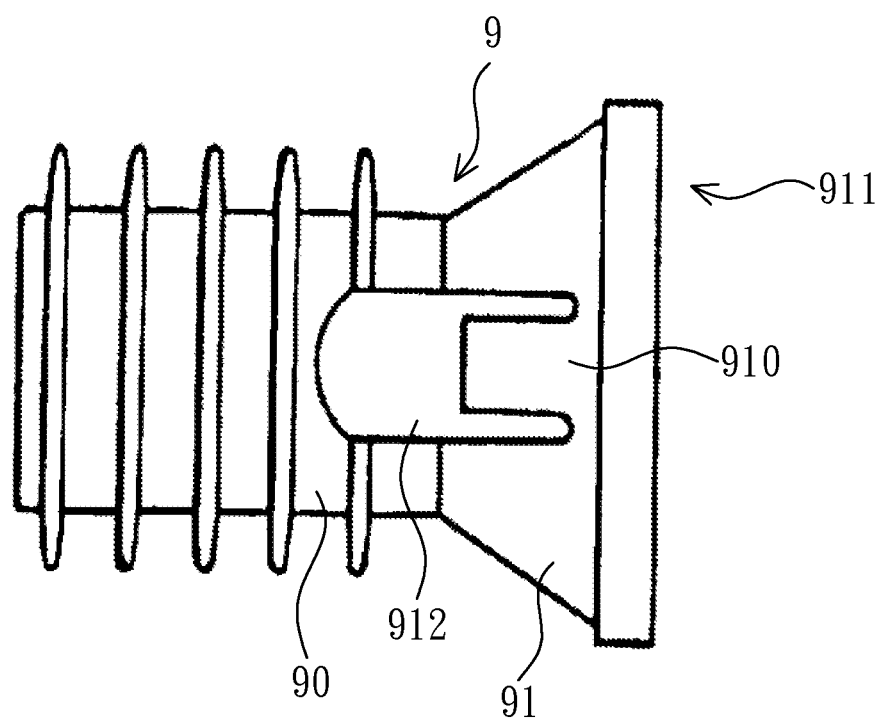
FIG. 7 is a side view of a conventional engagement assembly for connecting a reflector and a connecting rod.
Figure 8:
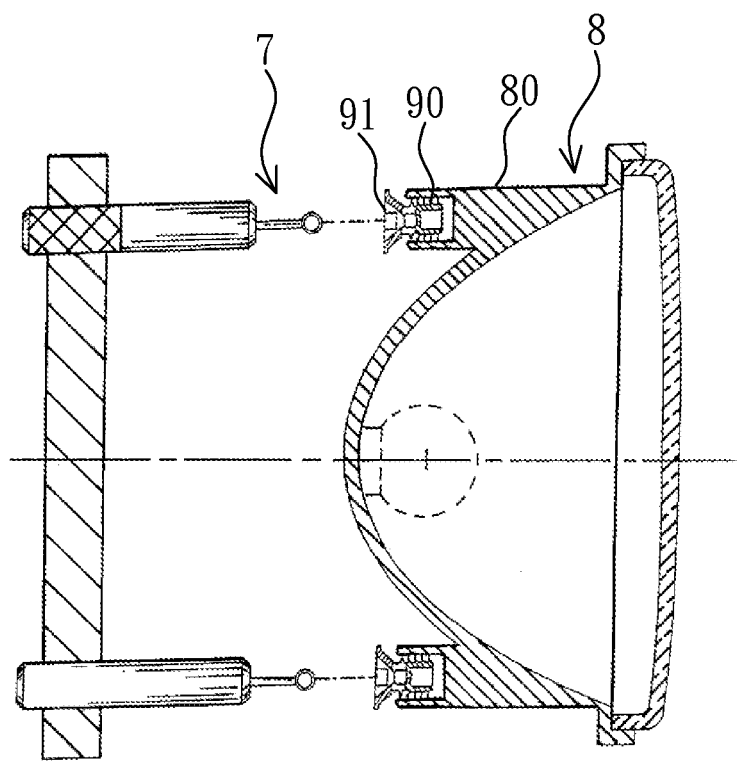
FIG. 8 is an operational view of the conventional engagement assembly for connecting a reflector and a connecting rod.

With reference to FIG. 6, an engagement assembly 1 in accordance with the present invention is use to be mounted between a linking post 20 of a reflector 2 and a connecting rod 3. The reflector 2 is an ordinary vehicle headlamp reflector. The connecting rod 3 is firmly mounted on a vehicle body and is used to be attached to the reflector 2 via the engagement assembly 1 of the present invention, such that the reflector 2 is able to be mounted on the vehicle body.

With further reference to FIGS. 1 to 5, the present invention comprises a fixing base 11 and a fixing plate 12.

In this embodiment, the fixing base 11 is column-shaped and is a plastic injected molded device. The fixing base 11 has a head accommodating room 111, a first protrusion ring 112, a second protrusion ring 113, a plate retaining space 114, two slits 116 and a connecting portion 117. The head accommodating room 111 is used for inserting a head portion 30 of the connecting rod 3 to hold the head portion 30. The first protrusion ring 112 has two side pillars 115 formed on a bottom thereof. The side pillars 115 are opposite to each other and surround the head accommodating room 111. The second protrusion ring 113 is integrally connected to the side pillars 115. The plate retaining space 114 is formed between the first protrusion ring 112 and the second protrusion ring 113, and is communicated with the head accommodating room 111. The slits 116 are formed on junctions of the side pillars 115 and the first protrusion ring 112, respectively. The connecting portion 117 is integrally connected to the second protrusion ring and is used to be attached to the linking post 20 of the reflector 2. The attachment is implemented by screwing or engaging, but is not limited thereto.

The fixing plate 12 is metallic. In this embodiment, the fixing plate 12 is a steel plate and mounted in the plate retaining space 114 of the fixing base 11. The fixing plate 12 has a position-limiting portion 121 and two fixing portions 122. The position-limiting portion 121 is substantially in a rectangular form and has a through hole 123 and at least two tongues 124. The through hole 123 corresponds to the head accommodating room 111 and is used for the head portion 30 of the connecting rod 3 to pass through. In this embodiment, the fixing plate 12 has two tongues 124, wherein the tongues 124 are formed on an inner edge of the through hole 123 and are opposite to each other. A distance between inner edges of the tongues 124 is shorter than an external diameter of the head portion 30 of the connecting rod 3. Besides, in this embodiment, each of the tongues 124 obliquely extends from the inner edge of the through hole 123 and is an elastic structure. And each of the tongues 124 has a strengthening portion 126 formed by a stress means at a junction between the tongue 124 and the inner edge of the through hole 123, so as to strengthen the connection between the tongue 124 and the fixing plate 12.

The fixing portions 122 are integrally connected to the position-limiting portion 121 and pass through the slits 116 of the fixing base 11, respectively. Each of the fixing portions 122 has a buckle portion 125 formed on an inner edge thereof. In this embodiment, each buckle portion 125 obliquely protrudes from a surface of the corresponding fixing portion 122 and is an elastic structure.

When the fixing plate 12 is to be attached to the fixing base 11, the position-limiting portion 121 of the fixing plate 12 enters the plate retaining space 114 of the fixing base 11, and the fixing portions 122 of the fixing plate 12 pass through the slits 116 of the fixing base 11, respectively, wherein the buckle portion 125 of each fixing portion 122 is forced to bend to pass through the slit 116. After passing through the slits 116 and returning to its former state, the buckle portion 122 then hooks up the pillar 115 of the fixing base 11, so that the fixing plate 12 is positioned in the plate retaining space 114 of the fixing base 11.

Figure 1:
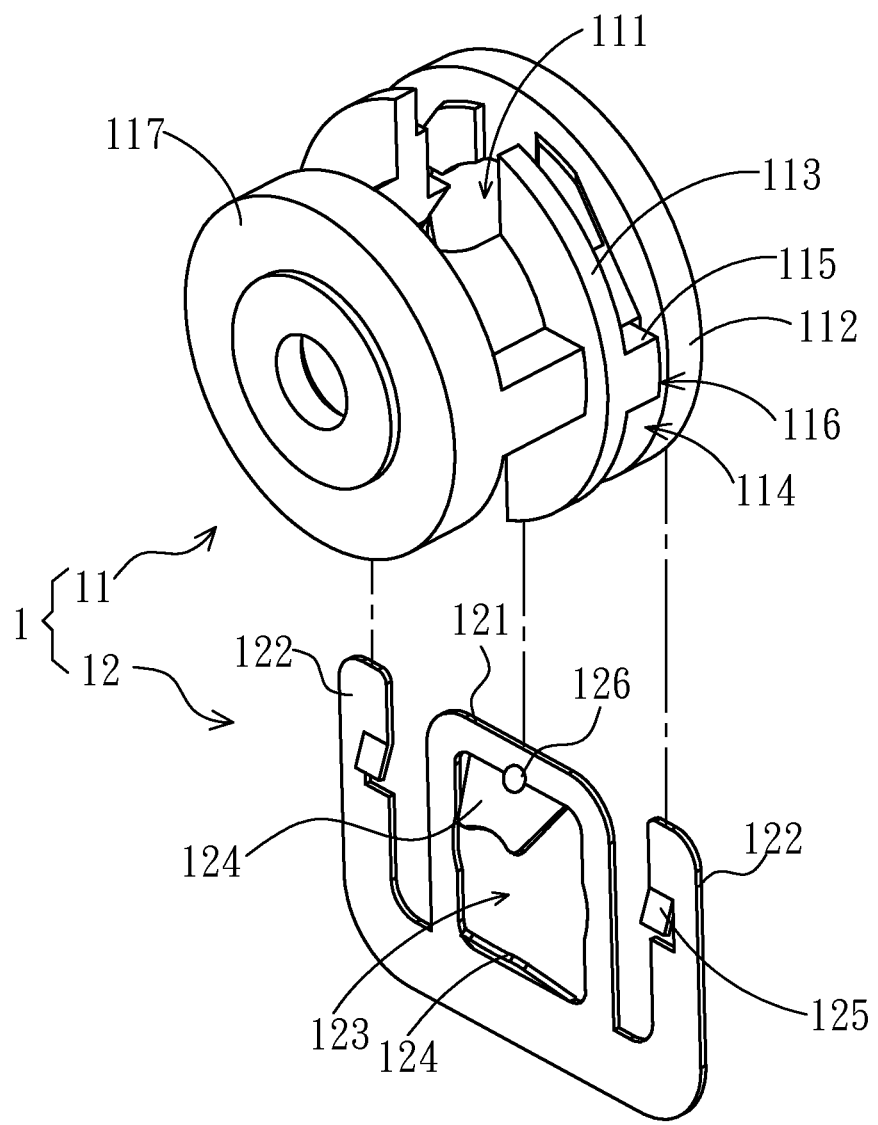
FIG. 1 is an exploded perspective view of an engagement assembly for connecting a reflector and a connecting rod according to a preferred embodiment of the present invention.
Figure 2:
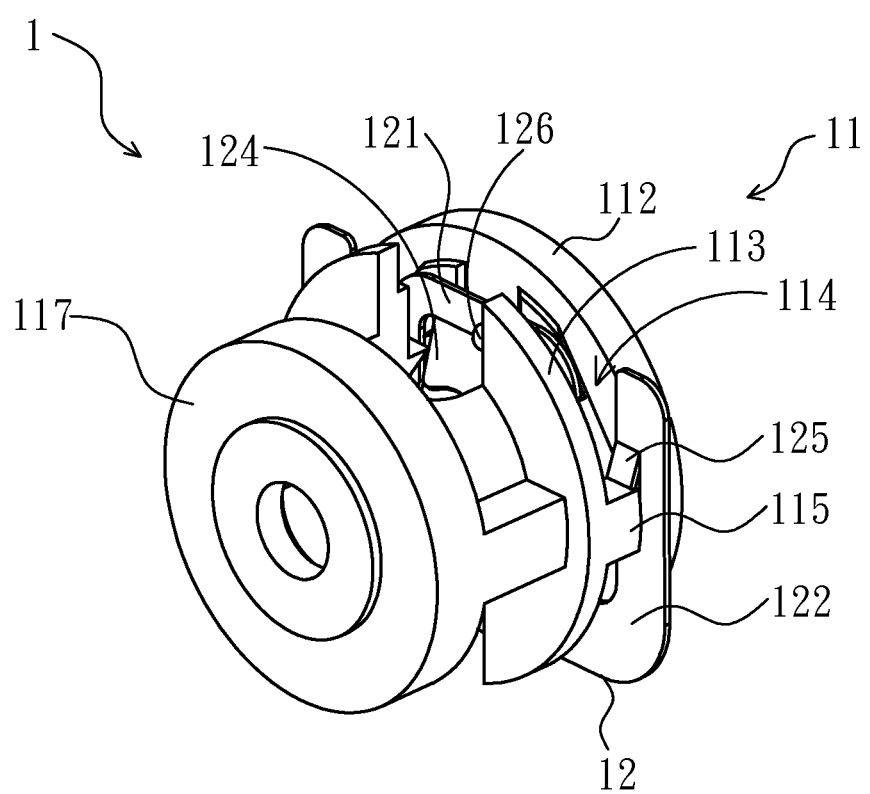
FIG. 2 is a perspective view of the engagement assembly for connecting a reflector and a connecting rod according to a preferred embodiment of the present invention.
Figure 3:
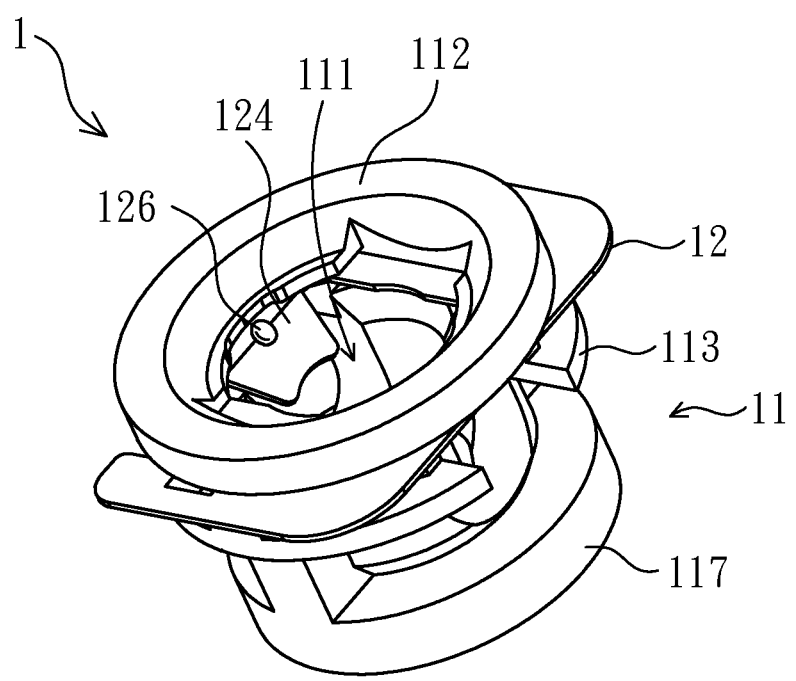
FIG. 3 is a perspective view from another angle in FIG. 2.
Figure 4:
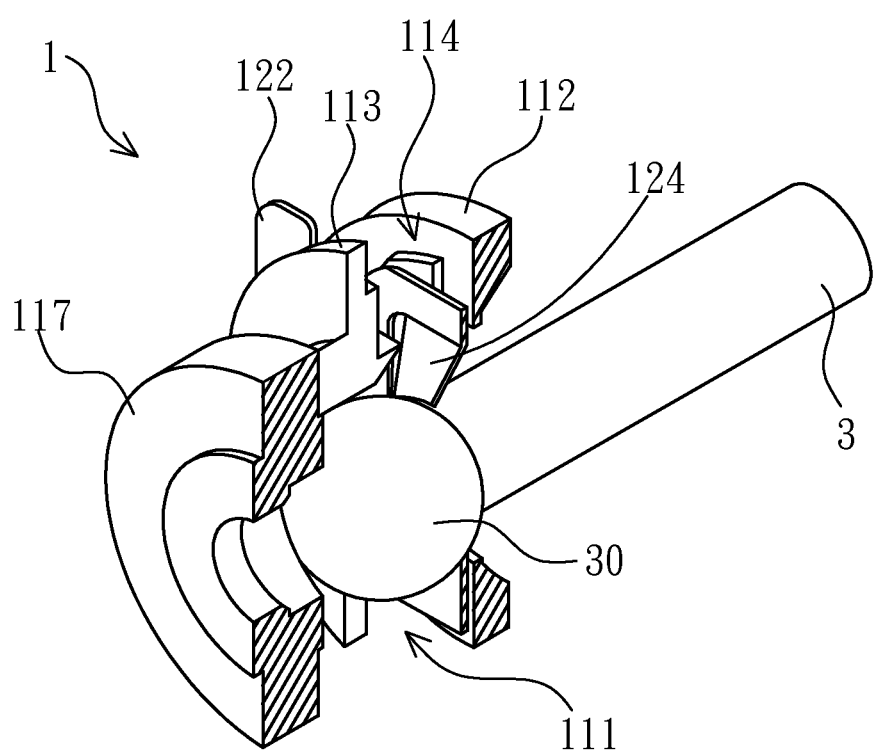
FIG. 4 is a partial cross-sectional perspective view of the engagement assembly for connecting a reflector and a connecting rod according to a preferred embodiment of the present invention.
Figure 5:
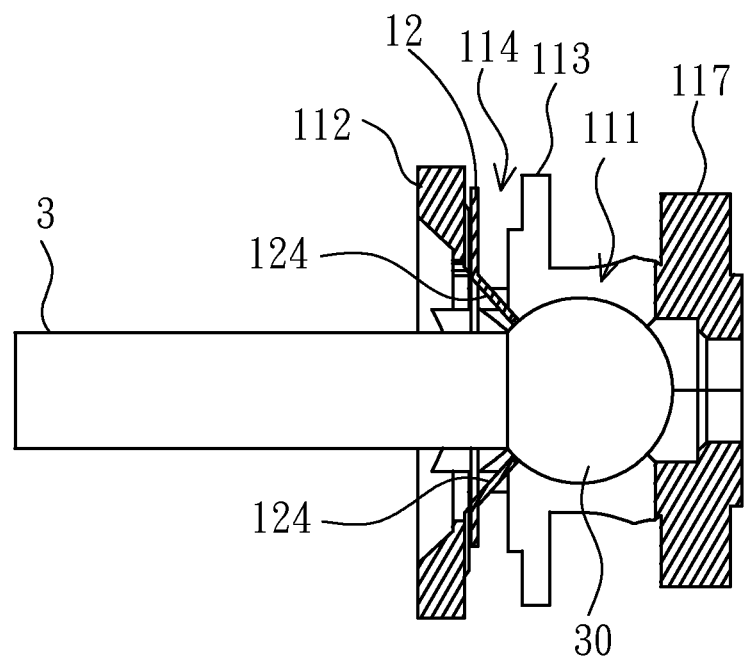
FIG. 5 is a side view in FIG. 4.

With reference to FIGS. 4, 5 and 6, the connecting portion 117 of the fixing base 11 is firstly connected to the linking post 20 of the reflector 2; the reflector 2 is then mounted on the head portion 30 of the connecting rod 3 via the engagement assembly 1 of the present invention. When the head portion 30 of the connecting rod 3 is entering the head accommodating room 111 of the fixing base 11, it pushes the tongues 124 of the fixing plate 12 in a forward direction. After the head portion 30 with a longer external diameter passes the tongues 124, the tongues 124 then return to former state and clamp the head portion 30, so that the head portion 30 is restricted in the head accommodating room 111 and is capable of appropriately moving inside the head accommodating room 111.

Compared with the conventional plastic injected molded engagement device that lacks tolerance of impact, the present invention combines a fixing base and a fixing plate, and uses the metallic fixing plate to attach itself to the head portion of the connecting rod. Since the metallic fixing plate has tolerance to impact and is not easily damaged, the present invention can relatively provide a stronger connection between the reflector and the connecting rod.

The present invention has been described with a preferred embodiment thereof and it is understood that many changes and modifications to the described embodiment can be carried out without departing from the scope and the spirit of the invention that is intended to be limited only by the appended claims.

What is claimed is:

1. An engagement assembly for connecting a reflector and a connecting rod, wherein the engagement assembly is used to be mounted between a linking post of a reflector and a connecting rod, and comprises:

a fixing base having a head accommodating room, a first protrusion ring, a second protrusion ring, a plate retaining space and two slits, wherein the head accommodating room is for inserting a head portion of the connecting rod; the first protrusion ring has two side pillars formed on a bottom thereof; the second protrusion ring is connected to the side pillars; the plate retaining space is formed between the first and the second protrusion rings; the slits are formed on junctions of the side pillars and the first protrusion ring, respectively; and a fixing plate mounted in the plate retaining space and having a position-limiting portion and two fixing portions, wherein the position-limiting portion has a through hole and at least two tongues, wherein the through hole corresponds to the head accommodating room and is used for the head portion of the connecting rod to pass through, and the tongues are formed on an inner edge of the through hole for clamping the head portion, and each of the tongues of the fixing plate obliquely extends from the inner edge of the through hole; the fixing portions are integrally connected to the position-limiting portion and pass through the slits of the fixing base, respectively, and each fixing portion has a buckle portion formed on an inner edge thereof, wherein the position-limiting portion is inserted into the plate retaining space from a side of the fixing base between the first and the second protrusion rings.

2. The engagement assembly as claimed in claim 1, wherein the fixing base further has a connecting portion, and the connecting portion is integrally connected to the second protrusion ring for being attached to the linking post of the reflector.

3. The engagement assembly as claimed in claim 2, wherein the tongues and the buckle portions are elastic structures.

4. The engagement assembly as claimed in claim 2, wherein a distance between inner edges of the tongues of the fixing plate is shorter than an external diameter of the head portion of the connecting rod.

5. The engagement assembly as claimed in claim 2, wherein each of the tongues has a strengthening portion formed at a junction between the tongue and the inner edge of the through hole.

6. The engagement assembly as claimed in claim 2, wherein the buckle portion of each of the fixing portions obliquely protrudes from a surface of the corresponding fixing portion.

7. The engagement assembly as claimed in claim 2, wherein the fixing plate is a steel plate.

8. The engagement assembly as claimed in claim 1, wherein the plate retaining space of the fixing base communicates with the head accommodating room.

9. The engagement assembly as claimed in claim 8, wherein a distance between inner edges of the tongues of the fixing plate is shorter than an external diameter of the head portion of the connecting rod.

10. The engagement assembly as claimed in claim 1, wherein the tongues and the buckle portions are elastic structures.

11. The engagement assembly as claimed in claim 10, wherein a distance between inner edges of the tongues of the fixing plate is shorter than an external diameter of the head portion of the connecting rod.

12. The engagement assembly as claimed in claim 1, wherein a distance between inner edges of the tongues of the fixing plate is shorter than an external diameter of the head portion of the connecting rod.

13. The engagement assembly as claimed in claim 1, wherein each of the tongues has a strengthening portion formed at a junction between the tongue and the inner edge of the through hole.

14. The engagement assembly as claimed in claim 1, wherein the buckle portion of each of the fixing portions obliquely protrudes from a surface of the corresponding fixing portion.

15. The engagement assembly as claimed in claim 1, wherein the fixing plate is a steel plate.

* * * * *